United States Patent [19]

Andersson

[11] Patent Number: 4,597,268

[45] Date of Patent: Jul. 1, 1986

[54] METHOD AND APPARATUS FOR GAS-COOLING

[76] Inventor: Bengt O. K. Andersson, Torsgränd 73, 432 00 Varberg, Sweden

[21] Appl. No.: 698,482

[22] Filed: Feb. 5, 1985

[30] Foreign Application Priority Data

Feb. 14, 1984 [SE] Sweden ............................ 8400774

[51] Int. Cl.$^4$ ............................................. F17D 17/06
[52] U.S. Cl. .......................................... 62/93; 62/113; 62/335; 62/513
[58] Field of Search .................... 62/93, 335, 113, 513

[56] References Cited

U.S. PATENT DOCUMENTS

| 3,596,474 | 8/1971 | Bloxham et al. | 62/93 |
| 3,739,594 | 6/1973 | Freese | 62/93 |
| 3,852,974 | 12/1974 | Brown | 62/335 |
| 4,193,443 | 3/1980 | Nanaumi et al. | 62/93 |
| 4,253,315 | 3/1981 | Fiedler | 62/93 |
| 4,287,724 | 9/1981 | Clark | 62/93 |

Primary Examiner—Ronald C. Capossela
Attorney, Agent, or Firm—Beveridge, DeGrandi & Weilacher

[57] ABSTRACT

The disclosure relates to a method and an apparatus for cooling a gas, for example compressed air, which is dried and thereafter fed into an evaporator (1) for cooling therein by means of a first refrigerant, which is cooled by means of a cooler (10) and fed into the evaporator (1) via cooling in an exchanger (15), in which the first refrigerant is cooled by means of a second refrigerant which, in its turn, is cooled by means of a second cooler (18).

13 Claims, 2 Drawing Figures

METHOD AND APPARATUS FOR GAS-COOLING

TECHNICAL FIELD

The present invention relates to a method of cooling a gas, for example compressed air, for use in, for example, machines for the blowing of chiefly hollow bodies such as bottles of plastic or other material, and an apparatus for carrying the method into effect.

BACKGROUND ART

In machines for the blowing of, for example, plastic bottles, use has hitherto been made of normal compressed air at approximately room temperature for blowing the objects into molds intended for the blow-molding. In attempts to increase production output rate, certain attempts have been made to use cooled nitrogen gas or carbon dioxide, but the production output rate increases thus attained have not been sufficient to outweigh the costs for the gas, for which reason the employment of nitrogen gas and carbon dioxide has not been motivated or been put to any appreciable use. Thus, there is a great need within the art for a cooled gas which can be obtained at reasonable cost.

OBJECT OF THE PRESENT INVENTION

The task forming the basis of the present invention is to satisfy the above-outlined need.

SOLUTION

This task is solved according to the present invention in the method described by way of introduction, in that the gas is dried before being fed into an evaporator for cooling the gas by means of a refrigerant in a first loop located in the evaporator, to which the refrigerant is fed from a second loop located in an exchanger, in which exchanger the refrigerant is cooled by means of a further refrigerant prevailing in a third loop. The refrigerant is compressed in a first cooler prior to passage through the second loop in the exchanger and cooling of the refrigerant prior to infeed into the first loop in the evaporator via a capillary tube. The further refrigerant is compressed in a second cooler prior to being fed into the third loop in the exchanger. The gas is filtered before the drying operation and, thereby, prior to being fed into the evaporator. The method according to the present invention is reduced into practice by means of an apparatus which is characterised by an evaporator with a first refrigerant loop, the evaporator being connected via a gas drying apparatus to a gas source and a machine for blowing of objects; the apparatus being further characterised in that the refrigerant loop is connected to a second loop in an exchanger with a third loop intended for a further refrigerant. The second refrigerant loop is connected to the first refrigerant loop by the intermediary of a capillary tube, and the second refrigerant loop is connected to the outlet from a first cooler, while the first loop is connected to the inlet of the cooler. The third loop in the exchanger intended for the further refrigerant is connected between the inlet and the outlet of a second cooler. The gas source is connected to the evaporator by the intermediary of one or more gas filters and the apparatus for drying the gas from the gas source before the gas is fed into the evaporator.

ADVANTAGES

By means of a method and an apparatus according to the present invention, it is possible, at relatively low cost, to produce a suitable blowing gas for use in machines for the blowing of, for example, plastic bottles. Thanks to the low temperature imparted to the gas according to the method of the present invention, and by means of an apparatus according to the present invention, production output rate in the blowing machine may be raised considerably. In practical tests, it has been demonstrated that production can be increased by 20–30% and more in certain cases. Since the costs for the gas are slight, capital investment costs for the apparatus according to the present invention proper can be written-off in an extremely short time. Moreover, the employment of cooled compressed air according to the present invention involves no hazard to the working environment whatsoever.

BRIEF DESCRIPTION OF THE ACCOMPANYING DRAWINGS

The nature of the present invention and its aspects will be more readily understood from the following brief description of the accompanying Drawings, and discussion relating thereto.

In the accompanying Drawings:

FIG. 1 is a diagram of an apparatus for carrying into effect a method according to one embodiment of the present invention; and FIG. 2 is a schematic view of a part of the apparatus of FIG. 1.

DESCRIPTION OF PREFERRED EMBODIMENT

Figure 1:
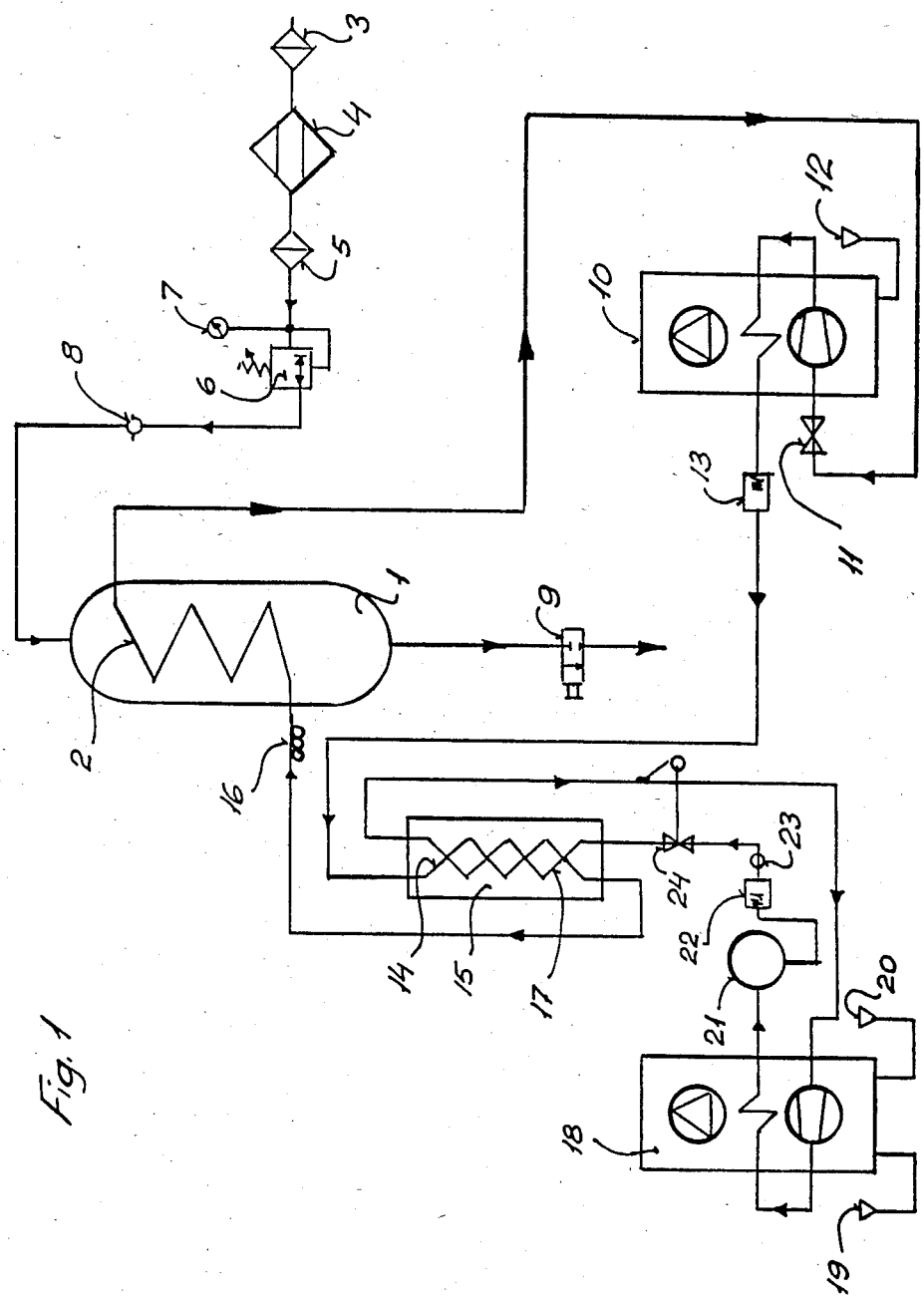

The embodiment of an apparatus for carrying into effect the method according to the present invention as illustrated in FIG. 1 includes and evaporator 1 with a refrigerant loop 2. The inlet of the evaporator 1 is coupled to a compressed air source of per se known type, eg. a compressed air tank, for which reason this is not shown on the Drawings. While the apparatus and the method according to the present invention will be described in conjunction with the cooling of compressed air, it is clear that any other gas whatever can be cooled in the same manner. Counting from the compressed air source, the following components are connected in a conduit from the inlet to the evaporator 1 to the compressed air source: a filter 3 for separating-off liquid from the compressed air, an apparatus 4 for drying the compressed air, a further filter 5 for separating-off dust from the compressed air, a pressure regulator 6 with instruments 7 and a non-return valve 8.

In the drying apparatus 4, the air is dried so that it has a low dew point. After dust separation in the filter 5, the dried and dust-free air is allowed to expand in the pressure regulator 6 to a lower pressure, whereby the dew point will become lower. In the present case, the pressure regulator 6 is a reduction valve, by means of which the pressure of the air is as good as halved for lowering the dew point. In one practical embodiment, the pressure is lowered from 8 to 4 Bar. After passage of the non-return valve 8, the compressed air enters the evaporator 1, in which the compressed air is cooled to a very low temperature, which, in the present case is minus 70° to 80° C.

From the evaporator 1, the cooled compressed air is fed by the intermediary of a valve 9 to the blowing machine and therein into a hollow body via a suitable nozzle which, in one type of blowing machine, may quite simply consist of a tube of a diameter of approx. 6 mm in which there is disposed a tube with an outer diameter of 4 mm and an inner diameter of approx. 2 mm, whereby the gap between the outer tube and the inner tube will be approx. 1 mm. In the outer tube, there are arranged, furthermore, a number of discharge orifices of a diameter of approx. 1.8 mm. Using such a nozzle, an extremely suitable ventilation in the hollow body will be attained.

For realising the desired cooling of the compressed air in the evaporator 1, a refrigerant is caused to flow through the refrigerant loop 2. The refrigerant loop 2 is coupled into a hose or conduit, the outlet of the refrigerant loop 2 being coupled to a cooler 10, via a suction pressure regulator 11. The cooler 10 is of a conventional type and comprises a compressor and a condensor, a pressostat 12 being connected to the cooler 10. The outlet of the cooler 10 is, by the intermediary of a drying apparatus 13 which is often designated a dry filter, connected to a refrigerant loop 14 in an exchanger 15. The outlet of the refrigerant loop 14 is coupled to the inlet of the refrigerant loop 2 via a capillary tube 16 of per se known type. To reduce the risk of blocking of the capillary tube 16, it may be advisable to place the dry filter 13 immediately ahead of the capillary tube instead of after the cooler 10.

The exchanger 15 includes a further refrigerant loop 17 whose outlet is coupled to the inlet of a cooler 18. This cooler 18 is of per se known type and comprises a compressor and a condensor. The cooler 18 is, further, provided with two pressostats 19 and 20. The outlet of the cooler 18 is coupled to the inlet of the refrigerant loop 17 via a tank or reservoir 21, a drying apparatus 22, a sight glass 23 and an expansion valve 24.

The refrigerant cooled by means of the cooler 18 is preferably a refrigerant of the type freon R502 and the refrigerant cooled by the cooler 10 is preferably a refrigerant of the type freon R13.

Thus, by the method according to the present invention, it is possible, using a relatively simple apparatus, to cool compressed air to a temperature as low as minus 70°-80° C. If desired, it is, naturally, possible to pre-cool the compressed air by means of a further evaporator whose refrigerant loop may be coupled to one of the coolers 10, 18.

It should also be observed that the pressostats 12, 19 and 20 serve for starting and stopping their coolers 10 and 18, respectively. The pressostat 12 switches off the cooler 10 at too high pressure of the refrigerant in the loop, while the pressostat 20 starts the cooler 10 at sufficiently low pressure and thereby sufficiently low temperature of the refrigerant, and the pressostat 19 starts the cooler at sufficiently high pressure, and thereby high temperature, and stops the cooler at low pressure and thereby low temperature. The apparatus 4 for drying the compressed air may be a so-called adsorption dryer which lowers the dew point of the compressed to minus 60° C. or lower. In the exchanger 15, the refrigerant from the cooler 10 is cooled to approx. minus 40°-45° C., and in the evaporator 1, the compressed air can be cooled to a temperature of minus 100°-110° C.

Figure 2:
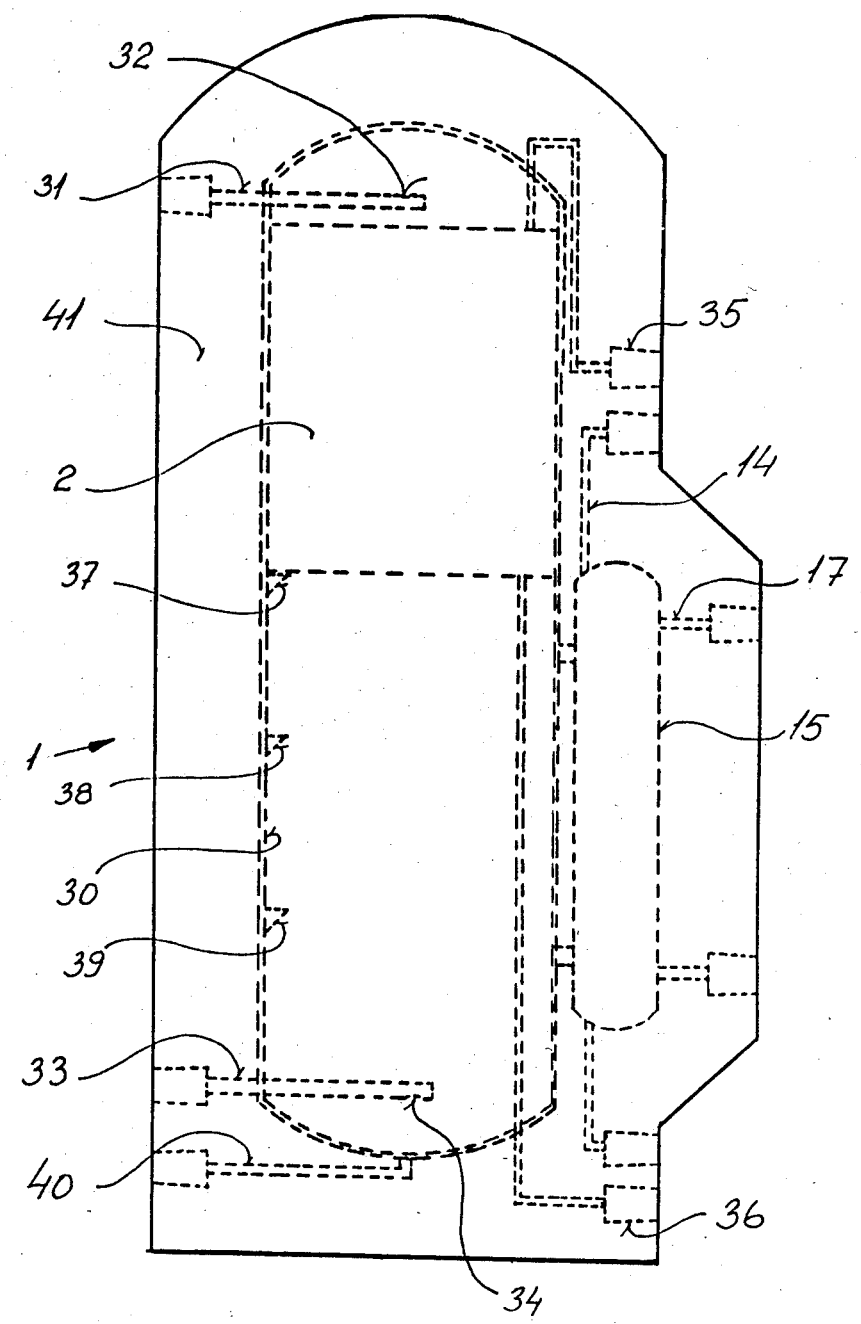

Turning to FIG. 2, in one practical embodiment of an apparatus according to the present invention, the evaporator 1 is in the form of a pressure vessel 30 with an air inlet 31, whose discharge orifice 32 is directed towards the top of the pressure vessel 30, so that the infed air is distributed throughout the entire vessel under downward flow through the vessel to its bottom. At the bottom, there is an air outlet 33, whose discharge orifice 34 is directed towards the bottom of the vessel. In the pressure vessel 30, the loop 2 is arranged as a per se known lamellar battery with inlet 35 and outlet 36. In the pressure vessel 30, brackets 37, 38 and 39 are provided for lamellar batteries of different sizes, as well as a moisture bleeder outlet 40. The exchanger 15 with the loops 14 and 17 is mounted on the outside of the pressure vessel 30 and may possibly be a coaxial exchanger which is disposed about the pressure vessel 30. The pressure vessel 30 and the exchanger 15 are enclosed in a suitable thermal insulation material 41, for example a suitable foamed plastic.

Naturally, the use of the cold compressed air is not restricted to machines for blowing hollow bodies, but the cold compressed air may be used in a multitude of conceivable cooling contexts, for example for the cooling of concrete.

I claim:

1. A method for cooling gas to low temperature, wherein the method comprises
   (A) drying a gas to be cooled;
   (B) feeding the dried gas to an evaporator;
   (C) feeding a first cold refrigerant through a refrigerant loop to the evaporator, carrying the refrigerant through the evaporator in heat exchange relation with the dried gas, and removing spent first refrigerant from the evaporator;
   (D) cooling spent first refrigerant from the evaporator;
   (E) passing the resulting cooled first refrigerant through a heat exchanger;
   (F) feeding a second cold refrigerant through another refrigerant loop to the heat exchanger and removing spent second refrigerant from the heat exchanger, wherein the second cold refrigerant entering the heat exchanger has a lower temperature than the first cold refrigerant entering the heat exchanger, and the temperature of the first cold refrigerant is lowered by heat exchange relation with the second cold refrigerant; and
   (G) removing cooled gas from the evaporator;
   wherein the first cold refrigerant from the heat exchanger is fed through a capillary tube into the evaporator at a temperature of −70° C. to −110° C. and the gas is cooled to a temperature of −70° C. to −110° C.

2. The method as recited in claim 1, wherein the pressure of the gas is reduced prior to its being fed into the evaporator, for lowering the dew point.

3. A method for cooling a gas to low temperature, wherein the method comprises
   (A) drying a gas to be cooled;
   (B) feeding the dried gas to an evaporator;
   (C) feeding a first cold refrigerant through a refrigerant loop to the evaporator, carrying the refrigerant through the evaporator in heat exchange relation with the dried gas, and removing spent first refrigerant from the evaporator;
   (D) cooling spent first refrigerant from the evaporator;
   (E) passing the resulting cooled first refrigerant through a heat exchanger; (F) feeding a second cold refrigerant through another refrigerant loop to the heat exchanger and removing spent second refrigerant from the heat exchanger, wherein the second cold refrigerant entering the heat exchanger has a lower temperature than the first cold refrigerant entering the heat exchanger, and the temperature of the first cold refrigerant is lowered by heat exchange relation with the second cold refrigerant;

(G) cooling the spent second refrigerant from the heat exchanger by compressing and condensing the refrigerant;

(H) recycling the resulting compressed and condensed second cold refrigerant to the heat exchanger;

(I) removing cooled gas from the evaporator;

wherein the first cold refrigerant from the heat exchanger is fed through a capillary tube into the evaporator at a temperature of −70° C. to −110° C. and the gas is cooled to a temperature of −70° C. to −110° C.

4. A method of blow molding to form a container, wherein the method comprises (A) providing a formable hollow body in a blow molding machine;

(B) drying a gas to be cooled;

(C) feeding the dried gas to an evaporator;

(D) feeding a first cold refrigerant through a refrigerant loop to the evaporator, carrying the refrigerant through the evaporator in heat exchange relation with the dried gas, and removing spent first refrigerant from the evaporator;

(E) cooling spent first refrigerant from the evaporator;

(F) passing the resulting cooled first refrigerant through a heat exchanger;

(G) feeding a second cold refrigerant through another refrigerant loop to the heat exchanger and removing spent second refrigerant from the heat exchanger, wherein the second cold refrigerant entering the heat exchanger has a lower temperature than the first cold refrigerant entering the heat exchanger, and the temperature of the first cold refrigerant is lowered by heat exchange relation with the second cold refrigerant;

(H) removing cooled gas from the evaporator; and (I) injecting the cooled gas into the hollow body in the blow molding machine to form the container;

wherein the first cold refrigerant from the heat exchanger is fed through a capillary tube into the evaporator at a temperature of −70° C. to −110° C. and the gas is cooled to a temperature of −70° C. to −110° C.

5. An apparatus for cooling a gas, wherein the apparatus comprises (A) an evaporator;

(B) means for drying a gas to be cooled;

(C) means for feeding the dried gas to the evaporator;

(D) a refrigerant loop comprising (1) a capillary tube for feeding a first cold refrigerant at a temperature of −70° C. to −110° C. to the evaporator;

(2) means for carrying the refrigerant through the evaporator, and (3) means for removing spent first refrigerant from the evaporator;

(E) cooling means in the refrigerant loop for lowering the temperature of spent first refrigerant from the evaporator;

(F) heat exchange means in the refrigerant loop through which the first cold refrigerant from the cooling means is passed to the capillary tube;

(G) another refrigerant loop for feeding a second cold refrigerant to the heat exchange means and for removing spent second refrigerant from the heat exchange means, wherein the second cold refrigerant entering the heat exchange means has a lower temperature than the first cold refrigerant entering the heat exchange means, and the temperature of the first cold refrigerant is lowered by heat exchange relation with the second cold refrigerant in the heat exchange means; and (H) means for removing cooled gas from the evaporator.

6. The apparatus as recited in claim 5, wherein the gas source is connected to the evporator (1) by the intermediary of one or more gas filters (3, 5) and the apparatus (4) for drying the gas from the gas source before the gas is fed into the evaporator (1).

7. The apparatus as recited in claim 5, wherein the refrigerant loop (2) of the evaporator (1) is disposed in a pressure vessel (30) with a gas inlet (31) which is directed towards the top of the pressure vessel (30) for distributing the gas throughout the entire refrigerant loop (2), and with a gas outlet (33) which is directed towards the bottom of the pressure vessel (30) for withdrawal of the gas from the pressure vessel (30).

8. An apparatus as claimed in claim 5 in which the first refrigerant has a different composition than the second refrigerant.

9. An apparatus as claimed in claim 5 in which the temperature is −70° C. to −80° C.

10. An apparatus as claimed in claim 5 wherein the heat exchange means, first refrigerant loop and second refrigerant loop are disposed on a pressure vessel.

11. An apparatus as claimed in claim 10 wherein the pressure vessel and heat exchange means are thermally insulated.

12. An apparatus as claimed in claim 10 wherein the pressure vessel and heat exchange means are thermally insulated with foamed plastic.

13. An apparatus for cooling a gas, wherein the apparatus comprises (A) an evaporator;

(B) means for drying a gas to be cooled;

(C) means for feeding the dried gas to the evporator;

(D) a refrigerant loop comprising (1) a capillary tube for feeding a first cold refrigerant at a temperature of −70° C. to −110° C. to the evaporator;

(2) means for carrying the refrigerant through the evaporator, and (3) means for removing spent first refrigerant from the evaporator;

(E) cooling means in the refrigerant loop for compressing and condensing spent first refrigerant from the evaporator;

(F) heat exchange means in the refrigerant loop through which the resulting compressed and condensed first cold refrigerant is passed to the capillary tube;

(G) another refrigerant loop for feeding a second cold refrigerant to the heat exchange means and for removing spent second refrigerant from the heat exchange means, wherein the second cold refrigerant entering the heat exchange means has a lower temperature than the first cold refrigerant entering the heat exchange means, and the temperature of the first cold refrigerant is lowered by heat exchange relation with the second cold refrigerant in the heat exchange means;

(H) second cooling means in said other refrigerant loop for compressing and cooling spent second refrigerant from the heat exchange means;

(I) means in said other refrigerant loop for recycling the resulting compressed and condensed second cold refrigerant to the heat exchange means; and (J) means for removing cooled gas from the evaporator.

* * * * *